(12) United States Patent
Terada (10) Patent No.: US 10,060,493 B2
(45) Date of Patent: Aug. 28, 2018

(54) DISK SPRING

(71) Applicant: NHK SPRING CO., LTD., Yokohama-shi, Kanagawa (JP)

(72) Inventor: Yusuke Terada, Kanagawa (JP)

(73) Assignee: NHK Spring Co., Ltd., Kanagawa (JP)

( * ) Notice: Subject to any disclaimer, the term of this patent is extended or adjusted under 35 U.S.C. 154(b) by 0 days.

(21) Appl. No.: 15/320,257

(22) PCT Filed: Jun. 22, 2015

(86) PCT No.: PCT/JP2015/003119
§ 371 (c)(1),
(2) Date: Dec. 20, 2016

(87) PCT Pub. No.: WO2015/194196
PCT Pub. Date: Dec. 23, 2015

(65) Prior Publication Data
US 2017/0159739 A1 Jun. 8, 2017

(30) Foreign Application Priority Data
Jun. 20, 2014 (JP) ................. 2014-127762

(51) Int. Cl.
*F16F 1/32* (2006.01)
*F16D 13/52* (2006.01)
(Continued)

(52) U.S. Cl.
CPC ............... *F16F 1/32* (2013.01); *F16D 13/52* (2013.01); *F16D 13/54* (2013.01); *F16D 13/583* (2013.01); *F16D 25/0638* (2013.01)

(58) Field of Classification Search
CPC .......... F16F 1/32; F16D 13/58; F16D 13/583; F16D 25/0638
(Continued)

(56) References Cited

U.S. PATENT DOCUMENTS 4,637,594 A * 1/1987 Saito .................. F16F 1/185
267/158
7,111,833 B2 * 9/2006 Wittkopp ............ F16D 25/0638
192/70.17
(Continued)

FOREIGN PATENT DOCUMENTS

GB 2 158 183 A 11/1985
JP 2002-122170 A 4/2002
(Continued)

*Primary Examiner* — Christopher P Schwartz
(74) *Attorney, Agent, or Firm* — Norris McLaughlin & Marcus, P.A.

(57) ABSTRACT

Provided is a disk spring which has a spring portion having a circular disk shape, the spring portion to be interposed between a pair of rotary members, for example an outer plate and a piston, being relatively movable in an axial direction to come close to and separate away from each other, wherein the spring portion has a rounded cross-section portion to be brought into contact with, for example, the outer plate, and a straight cross-section portion being continuous to the rounded cross-section portion and being formed on at least one of an inner diameter side and an outer diameter side of the spring portion so as to be allowed to be brought into contact with, for example, the piston and be compressed between both the rotary members in a close contact state.

6 Claims, 10 Drawing Sheets

(51) Int. Cl.
  *F16D 25/0638* (2006.01)
  *F16D 13/58* (2006.01)
  *F16D 13/54* (2006.01)

(58) Field of Classification Search
  USPC .................................................. 267/160–165
  See application file for complete search history.

(56) References Cited

U.S. PATENT DOCUMENTS

| | | | | |
|---|---|---|---|---|
| 8,272,490 | B2* | 9/2012 | Obergasser | F16D 13/583 |
| | | | | 192/85.39 |
| 9,003,850 | B2* | 4/2015 | Hesselmann | F16F 1/32 |
| | | | | 72/53 |
| 9,234,551 | B2* | 1/2016 | Heitzenrater | F16D 23/14 |
| 2010/0247296 | A1* | 9/2010 | Matsuyama | F01D 17/165 |
| | | | | 415/170.1 |

FOREIGN PATENT DOCUMENTS

| | | |
|---|---|---|
| JP | 2008-075877 A | 4/2008 |
| JP | 2009-144545 A | 7/2009 |

\* cited by examiner

DISK SPRING

FIELD OF THE INVENTION

The present invention relates to a disk spring used to absorb shock generated when, for example, fastening a clutch having a multi-plate clutch mechanism of an automatic transmission or the like for an automobile.

BACKGROUND OF THE INVENTION

Conventionally, a multi-plate clutch mechanism for an automatic transmission (AT), a metal belt type automatic transmission (CVT) or the like for an automobile uses a disk spring to absorb shock generated when fastening a clutch.

Figure 18:
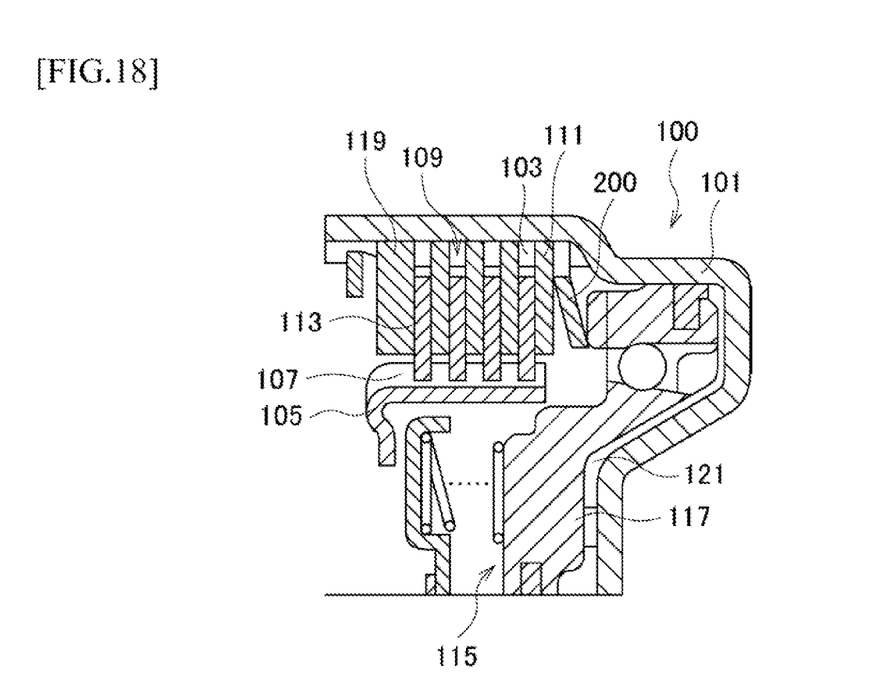
FIG. 18 is a sectional view of an essential part of a multi-plate clutch mechanism illustrating attachment to a disk spring according to a related art.

FIG. 18 is an enlarged sectional view of an essential part illustrating a configuration of a multi-plate clutch mechanism 100 to which a conventional disk spring 200 disclosed in Patent document 1 is applied. The multi-plate clutch mechanism 100 is provided with a clutch drum 101 forming a substantially bottomed cylindrical shape, an inner circumferential surface of which has inner splines 103 extending in an axial direction. A clutch hub 105 is concentrically arranged inside the clutch drum 101 and splines 107 are formed on its outer circumferential surface.

Between the clutch drum 101 and the clutch hub 105, outer plates 111 and inner plates 113 of a friction clutch 109 are alternately arranged. The outer plates 111 engage with the inner splines 103 of the clutch drum 101 and the inner plates 113 engage with the splines 107 of the clutch hub 105.

On one side of the friction clutch 109, a piston 117 of a hydraulic actuator 115 is arranged, on the other side thereof, a pressure plate 119 is arranged. The hydraulic actuator 115 is provided with an oil pressure chamber 121 between the piston 117 and the clutch drum 101.

Between the outer plate 111 of the friction clutch 109 and the piston 117 of the hydraulic actuator 115, a disk spring 200 is interposed. In this disk spring 200, an outer peripheral side faces the outer plate 111 of the friction clutch 109 and an inner peripheral side faces the piston 117 of the hydraulic actuator 115.

In this multi-plate clutch mechanism 100, hydraulic oil is fed to the oil pressure chamber 121 and then the piston 117 driven by oil pressure presses the outer plates 111 and the inner plates 113 of the friction clutch 109 through the disk spring 200 against the pressure plate 119.

With this pressing, the friction clutch 109 is fastened according to pressing force to control torque transmission between the clutch drum 101 and the clutch hub 105.

At this time, the disk spring 200 elastically deforms with respect to the outer plate 111 according to the pressing of the piston 117 to absorb shock generated when fastening the clutch.

Figure 19:
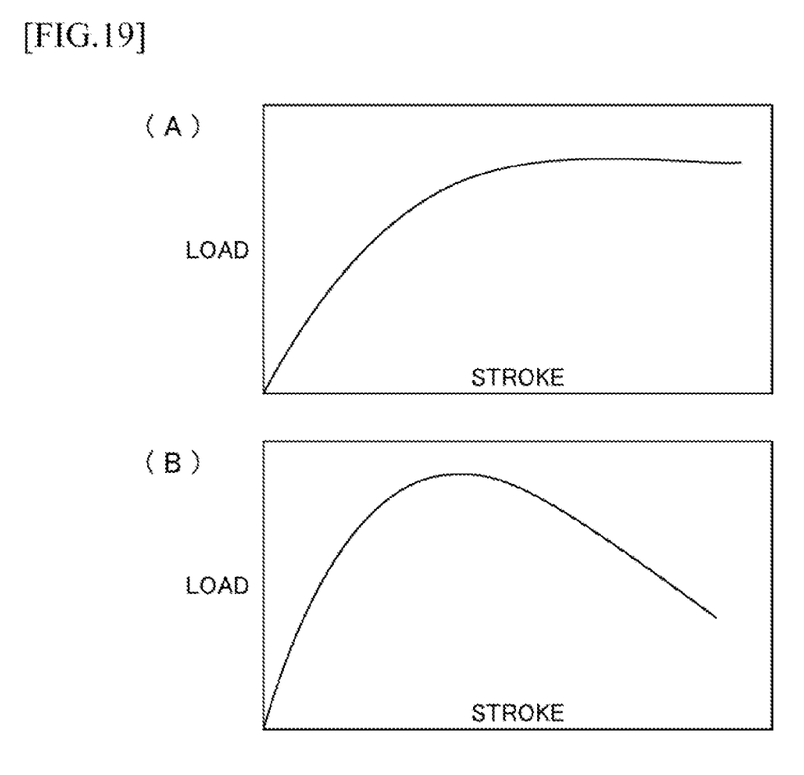
FIG. 19(A) and FIG. 19(B) are loading characteristic graphs of disk springs according to a related art.

A general loading characteristic of this disk spring 200 is a characteristic in which a spring constant is reduced relative to a deflection amount over a certain deflection amount as illustrated in FIGS. 19(A) and (B). Accordingly, there is a problem that the thickness of the disk spring 200 needs to be increased in order to ensure required load, thereby to cause the disk spring to be assembled into a limited space by constraint.

PATENT DOCUMENT 1: JP2008-75877A

SUMMARY OF THE INVENTION

A problem to be solved is that the thickness of the disk spring needs to be increased in order to ensure required load, thereby to cause the disk spring to be assembled into a limited space by constraint.

The present invention provides a disk spring, capable of making it easy to ensure required load without increase in thickness according to a characteristic in which a spring constant increases relative to a deflection amount over a certain deflection amount. The disk spring includes a spring portion having a circular disk shape, the spring portion to be interposed between a pair of rotary members being relatively movable in an axial direction to come close to and separate away from each other, wherein the spring portion has a rounded cross-section portion to be brought into contact with one of the rotary members, and a straight cross-section portion being continuous to the rounded cross-section portion and being formed on at least one of an inner diameter side and an outer diameter side of the spring portion to be allowed to be brought into contact with the other of the rotary members and be compressed between both the rotary members in a close contact state.

The present invention, because of the aforementioned configuration, smoothly shifts a contact position of the rounded cross-section relative to one of the rotary members toward the inner diameter side or the outer diameter side when the pair of the rotary members relatively move in the axial direction to come close to each other, so that the spring contact increases without reduction relative to even a deflection amount over a certain deflection amount. Accordingly, it is easy to ensure required load without increase in thickness of the disk spring.

Further, since the straight cross-section portion is allowed to be compressed between both the rotary members in a close contact state, a loading characteristic of the spring portion is stable.

EMBODIMENT FOR CARRYING OUT THE INVENTION

In order to make it easy to ensure required load without increase in thickness of a disk spring according to a characteristic in which a spring constant increases relative to even a deflection amount over a certain deflection amount, a spring portion is realized by having a rounded cross-section portion to be brought into contact with one of rotary members, and a straight cross-section portion being continuous to the rounded cross-section portion and being formed on at least one of an inner diameter side or an outer diameter side of the spring portion so as to be allowed to be brought into contact with the other of the rotary members and be compressed between both the rotary members in a close contact state.

Figure 1A:
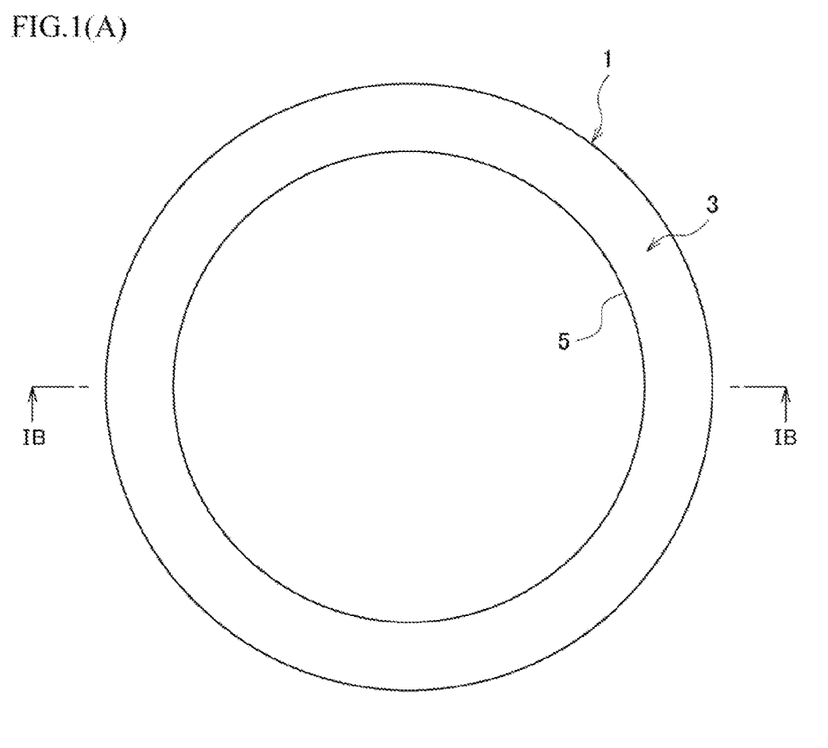
FIG. 1(A) is a front view of a disk spring and FIG. 1(B) is a sectional view taken along a line IB-IB of FIG. 1(A) according to an embodiment 1.
Figure 1B:
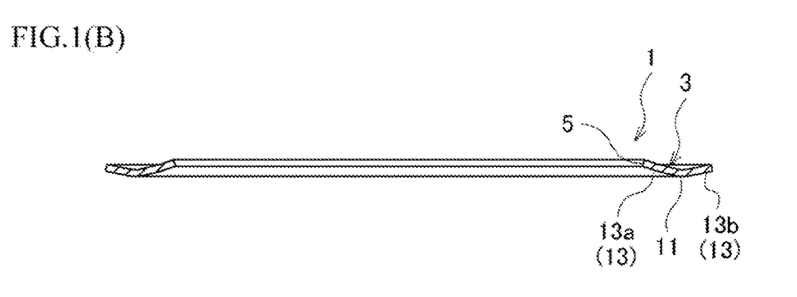
Figure 2:
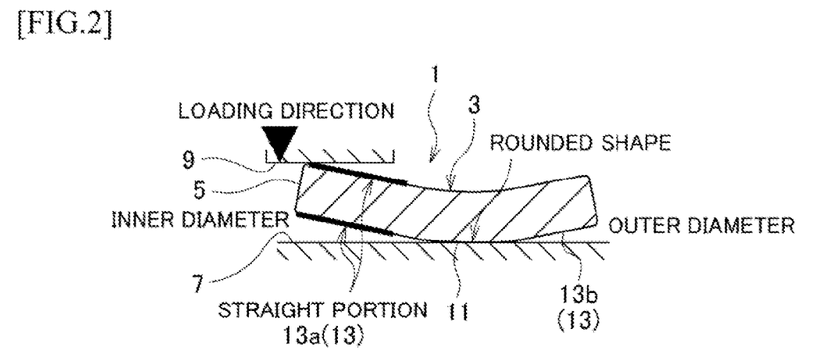
FIG. 2 is a sectional view of a spring portion according to the embodiment 1.
Figure 3:
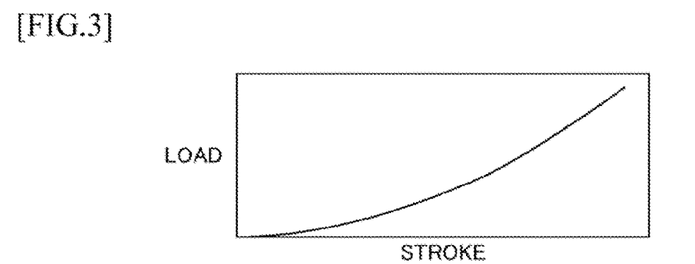
FIG. 3 is a loading characteristic graph of the disk spring according to the embodiment 1.

FIG. 1(A) is a front view of a disk spring and (B) is a sectional view taken along a line IB-IB of (A), FIG. 2 is a sectional view of a spring portion, and FIG. 3 is a loading characteristic graph of the disk spring.

As illustrated in FIGS. 1 and 2, the disk spring 1 has a spring portion 3 with a circular disk shape. Within an inner diameter of the spring portion 3, a hole 5 is provided. This spring portion 3 of the disk spring 1 is used to be interposed between a pair of rotary members being relatively movable in an axial direction to come close to and separate away from each other.

For example, the disk spring 1 is assembled in a multi-plate clutch mechanism for an automatic transmission (AT), a metal belt type automatic transmission (CVT) or the like for an automobile in the same way as FIG. 18. One of the pair of the rotary members is an outer plate 7 of a friction clutch and the other of the same is a piston 9 of a hydraulic actuator.

In this case, an inner diameter side of the disk spring 1 is allowed to be pressed against the outer plate 7 by pressure of the piston 9 in a close contact state. It should be noted that the outer plate 7 and the piston 9 are illustrated so as to be cut down.

In addition, assembly of the disk spring 1 is not particularly limited but may be to assembly the disk spring, for example, between a pressure plate of the friction clutch and a stopper on a clutch drum as a pair of rotary members.

In this case, an outer diameter side of the disk spring 1 is allowed to be compressed between both the rotary members in a close contact state. In addition, a following straight cross-section portion on the inner diameter side may be omitted.

The spring portion 3 is formed with an uniform thickness and has a rounded cross-section portion 11 and a straight cross-section portion 13.

The spring portion 3 is formed by pressing and the rounded cross-section portion 11 is to be brought into contact with the outer plate 7 or the like as one of the rotary members. According to the embodiment, a central portion of the rounded cross-section portion 11 forms a point of contact point and comes into contact with the outer plate 7 in a free state.

A curvature radius R and a central angle A (not illustrated) of the rounded cross-section portion 11 are optionally as long as an equation explained later is satisfied. A center of the curvature of the rounded cross-section portion 11 is positioned on a straight line intersecting the point of contact of the rounded cross-section portion 11 relative to the outer plate 7 and being parallel with a rotary axis of the outer plate 7.

In addition, the rounded cross-section portion 11 may be configured by a hyperbola, an elliptic curve, or other curves.

The straight cross-section portion 13 is continuous to the rounded cross-section portion 11, is formed on the inner diameter side and the outer diameter side of the spring portion 3 and has an inner diameter side straight cross-section portion 13a and an outer diameter side straight cross-section portion 13b. In FIG. 2, the inner diameter side straight cross-section portion 13a is represented with a pair of thick lines for clarity. It should be noted that the straight cross-section portion 13 may be formed on one of the inner diameter side and the outer diameter side. In this case, the rounded cross-section portion 11 may be formed so as to reach the outer dimeter side or the inner diameter side on which the straight cross-section portion 13 is not formed.

The inner diameter side straight cross-section portion 13a is allowed to be brought into contact with the piston 9 as the other of the rotary members and be compressed between the outer plate 7 and the piston 9 as both the rotary members in a close contact state. In this compression, the rounded cross-section portion 11 is not compressed between the outer plate 7 and the piston 9. It, therefore, is possible that the inner diameter side straight cross-section portion 13a is surely compressed between the outer plate 7 and the piston 9 in the close contact state to surely obtain a loading characteristic.

Continuity of the inner diameter side straight cross-section portion 13a and the outer diameter side straight cross-section portion 13b to the rounded cross-section portion 11 is ceaselessly smoothly performed without a step or corner. In particular, the inner diameter side straight cross-section portion 13a and the outer diameter side straight cross-section portion 13b are extended in a roundness-tangent-line direction of each end of the rounded cross-section portion 11.

In addition, the embodiment may set the outer diameter side straight cross-section portion 13b to have an angle parallel to the outer plate 7.

Then, in the multi-plate clutch mechanism into which the disk spring 1 is incorporated in the same way as FIG. 18, hydraulic oil is fed to an oil pressure chamber and then the piston 9 driven by oil pressure initiates to press an inner diameter side edge portion of the inner diameter side straight cross-section portion 13a of the disk spring 1 so that the inner diameter side cross-section portion 13a displaces against the outer plate 7 in a close contact direction as pressing force increases.

With this displacement, the point of contact of the rounded cross-section portion 11 relative to the outer plate 7 is gradually shifted toward the inner diameter side to increase a spring constant.

The pressing force of the piston 9, therefore, is transmitted to the outer plate 7 of the friction clutch through the rounded cross-section portion 11 of the disk spring 1 so that the outer plates 7 and the unillustrated inner plates are pressed against the pressure plate.

With this pressing, the friction clutch is fastened according to the pressing force to control torque transmission between the clutch drum and the clutch hub.

At this time, the disk spring 1 elastically deforms while gradually shifting the point of contact of the rounded cross-section portion 11 with respect to the outer plate 7 toward the inner diameter side as explained above, thereby to absorb shock generated when fastening a clutch while increasing the spring constant as explained above.

This loading characteristic of the disk spring 1 is one in which the spring constant increases and also the load increases with respect to the deflection amount even exceeding the certain deflection amount as illustrated in FIG. 3. Accordingly, the disk spring 1 easily secures required load without increase in thickness.

Namely, it is possible that assembly of the disk spring 1 to a limited space is smoothly and easily conducted.

Figure 4:
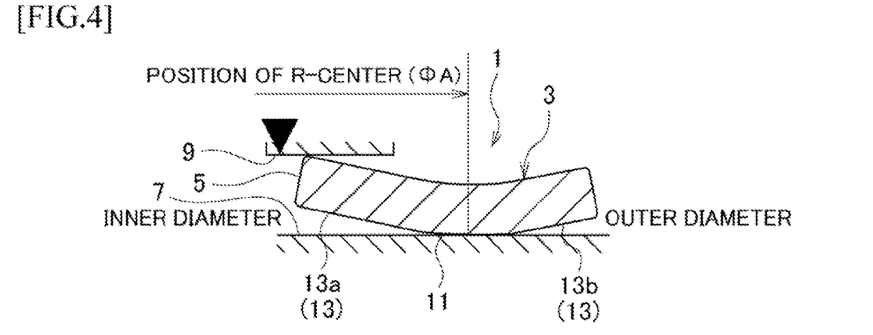
FIG. 4 is a sectional view of the spring portion illustrating a position of a center of curvature of a rounded cross-section portion according to the embodiment 1.
Figure 5:
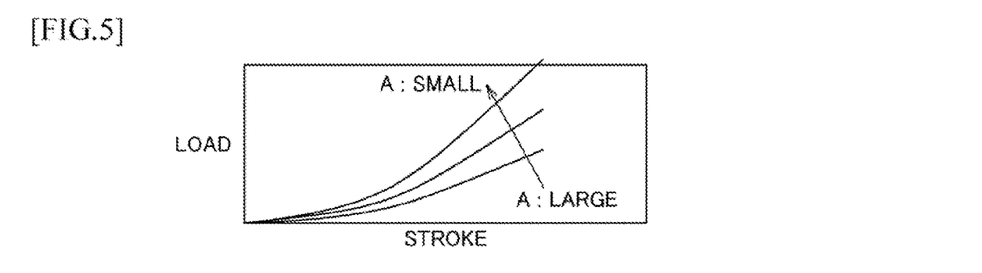
FIG. 5 is a loading characteristic graph illustrating variation in the loading characteristic of the disk spring according to variation in the position of the center of curvature of a rounded cross-section portion according to the embodiment 1.

FIG. 4 is a sectional view of the spring portion illustrating a position of the center of curvature of the rounded cross-section portion and FIG. 5 is a loading characteristic graph illustrating variation in the loading characteristic of the disk spring according to variation in the position of the center of curvature of the rounded cross-section portion.

In FIG. 4, a position of the point of contact of the rounded cross-section portion 11 relative to the outer plate 7 is defined as a position of a roundness center (a position of an R-center): $\phi A$ relative to a center of rotation of the rotary members. Shifting the position of the R-center: $\phi A$ shifts an initial power point, so that it is possible to control magnitude of load. The limit of the position of the R-center is a position at which the straight cross-section portion 13 cannot be formed on the inner diameter side or the outer diameter side.

This loading characteristic of the disk spring 1 according to the change in the position of the R-center: $\phi A$ is as illustrated in FIG. 5. A rise of the load relative to a stroke increases as $\phi A$ reduces, so that it is possible to further enlarge the increase of the spring constant relative to the deflection amount.

Figure 6:
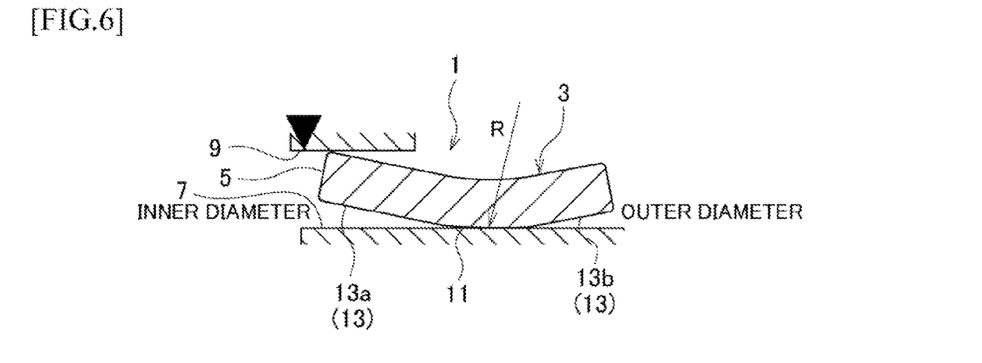
FIG. 6 is a sectional view of the spring portion illustrating a curvature radius of the rounded cross-section portion according to the embodiment 1.
Figure 7:
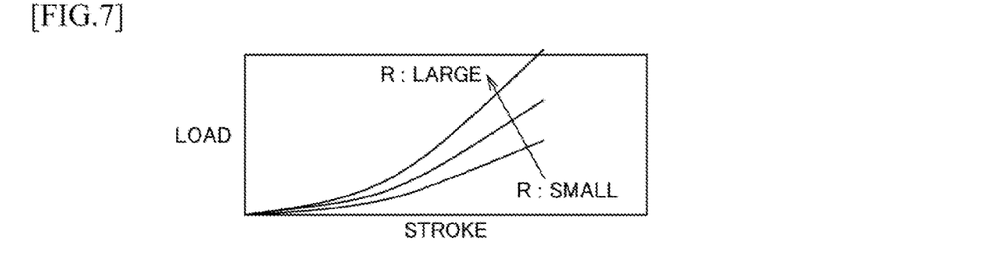
FIG. 7 is a loading characteristic graph illustrating variation in the loading characteristic of the disk spring according to variation in the curvature radius of the rounded cross-section portion according to the embodiment 1.

FIG. 6 is a sectional view of the spring portion illustrating the curvature radius of the rounded cross-section portion and FIG. 7 is a loading characteristic graph illustrating variation in the loading characteristic of the disk spring according to variation in the curvature radius of the rounded cross-section portion.

In FIG. 6, changing a size of the curvature radius R of the rounded cross-section portion 11 shifts an initial point of application of force, so that it is possible to control magnitude of load. The upper limit of the size of R is a size in which the straight cross-section portion 13 cannot be formed on the inner diameter side or the outer diameter side.

This loading characteristic of the disk spring 1 according to change in the curvature radius R is as illustrated in FIG. 7. A rise of the load relative to the stroke increases as R increases, so that it is possible to further enlarge the increase of the spring constant relative to the deflection amount.

Figure 8:
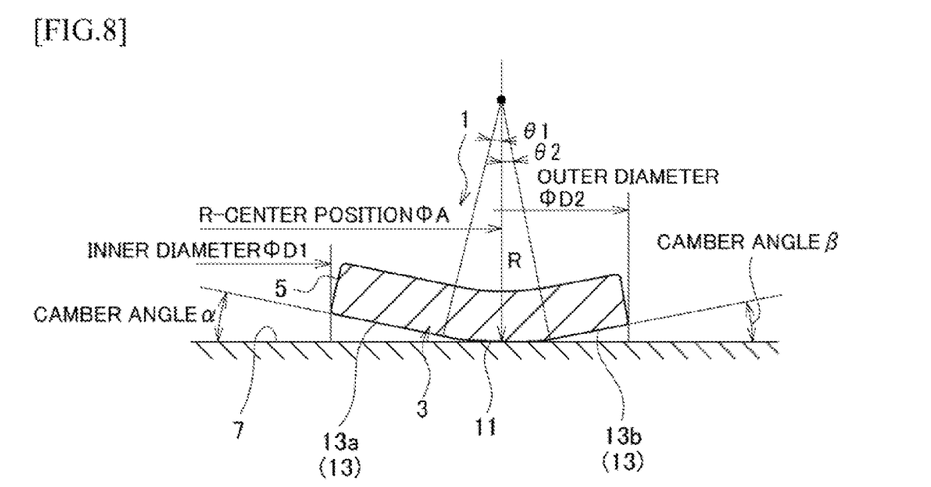
FIG. 8 is a sectional view illustrating a positional relation among respective portions of the spring portion according to the embodiment 1.

FIG. 8 is a sectional view of a positional relation among respective portions of the spring portion.

As explained above, the spring portion 3 has the rounded cross-section portion 11 and takes a form in which the straight cross-section portion 13 is present on the inner diameter side or the outer diameter side. This condition is defined as follows.

In a case where the straight cross-section portion 13 is formed on the inner diameter side of the spring portion 3, under an allocation of the curvature radius of the rounded cross-section portion 11: R, an inner diameter side central angle of the rounded cross-section portion 11: $\theta 1$, a radial position of the center of curvature of the rounded cross-section portion 11: $\phi A$, the inner diameter of the spring portion 3: $\phi D1$, and a camber angle of the inner diameter side straight cross-section portion 13a relative to the outer plate 7: $\alpha$, the spring portion 3 satisfies $$R \times \tan\theta 1 < (A-D1)/\cos\alpha.$$

It should be noted that the inner diameter side central angle $\theta 1$ means one on the inner diameter side in a case where a central angle of the rounded cross-section portion 11 is divided by the radius R connecting the point of contact of the rounded cross-section portion 11 relative to the outer plate 7 and the center of curvature of the rounded cross-section portion 11.

In a case where the straight cross-section portion 13 is formed on the outer diameter side of the spring portion 3, under an allocation of the curvature radius of the rounded cross-section portion 11: R, an outer diameter side central angle of the rounded cross-section portion 11: $\theta 2$, the radial position of the center of curvature of the rounded cross-section portion 11: $\phi A$, an outer diameter of the spring portion 3: $\phi D2$, and a camber angle of the outer diameter side straight cross-section portion 13b relative to the outer plate 7: $\beta$, the spring portion 3 satisfies $$R \times \tan\theta 2 < (D2-A)/\cos\beta.$$

It should be noted that the outer diameter side central angle $\theta 2$ means one on the outer diameter side in the case where the central angle of the rounded cross-section portion 11 is divided as explained above.

In this way, the spring constant increases due to the rounded cross-section portion 11 in proportion to the deformation without increase in thickness of the disk spring 1, so that it is easy to ensure required load.

Further, since there is no need to increase the thickness of the disk spring 1, it is naturally assembled into a limited space of the multi-plate clutch mechanism or the like.

Furthermore, since the straight cross-section portion 13 is allowed to be compressed between the outer plate 7 and the piston 9 as both the rotary members in the close contact state, the loading characteristic of the spring portion 3 is stable and it is possible to accurately control to fasten the friction clutch.

Figure 9:
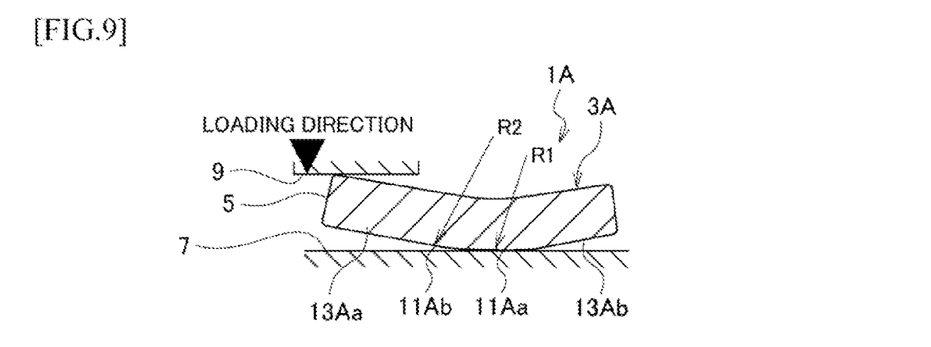
FIG. 9 is a sectional view of a spring portion, a rounded cross-section portion of which is formed with a plurality of curvatures according to an embodiment 2.
Figure 10:
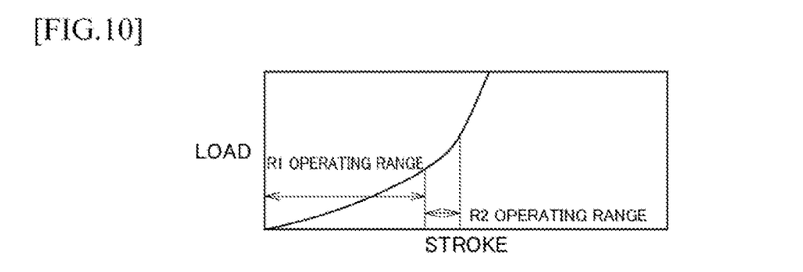
FIG. 10 is a loading characteristic graph of the disk spring according to the embodiment 2.

FIGS. 9 and 10 relate to the embodiment 2 of the present invention in which FIG. 9 is a sectional view of a spring portion, a rounded cross-section portion of which is formed with a plurality of curvatures and FIG. 10 is a loading characteristic graph of the disk spring.

In FIG. 9, a spring portion 3A of a disk spring 1A of this embodiment has a rounded cross-section portion formed with a plurality of curvature radiuses R1, R2 so that first and second rounded cross-section portions 11Aa, 11Ab are smoothly continuous to each other. The first rounded cross-section portion 11Aa is smoothly continuous to an outer diameter side straight cross-section portion 13Ab and the second rounded cross-section portion 11Ab is smoothly continuous to an inner diameter side straight cross-section portion 13Aa like the embodiment 1.

This loading characteristic of the disk spring 1A according to change in the curvature radius R is as illustrated in FIG. 10. An operating range of R1 is continuous to an operating range of R2, so that it is possible to further enlarge the increase of the spring constant relative to the deflection amount.

In addition, the change in the structure, the operation and the effect are the same as of the embodiment 1.

Figure 11:
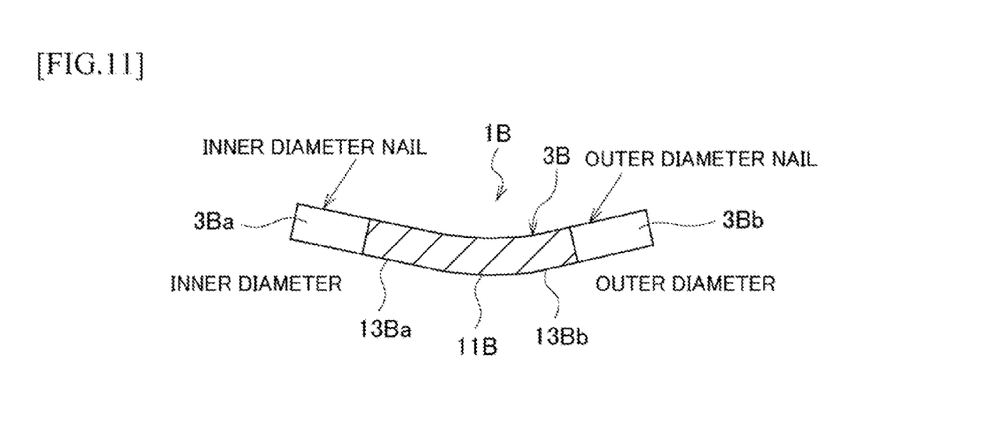
FIG. 11 is a sectional view of a spring portion that is provided with nails on inner and outer diameter sides according to an embodiment 3.
Figure 12:
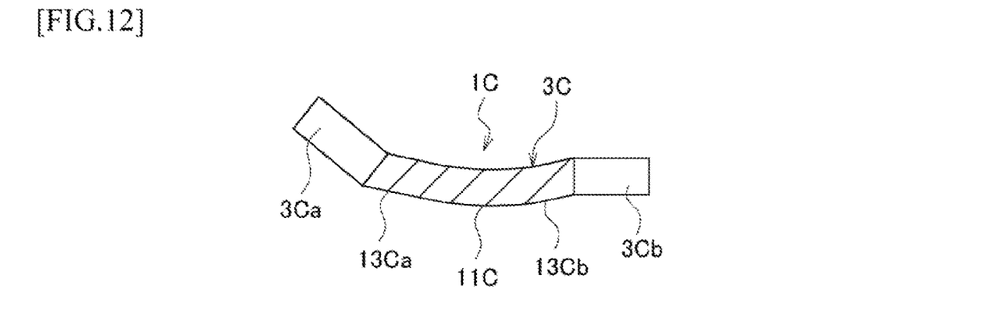
FIG. 12 is a sectional view illustrating a spring portion that is provided with nails on inner and outer diameter sides according to the embodiment 3.
Figure 13:
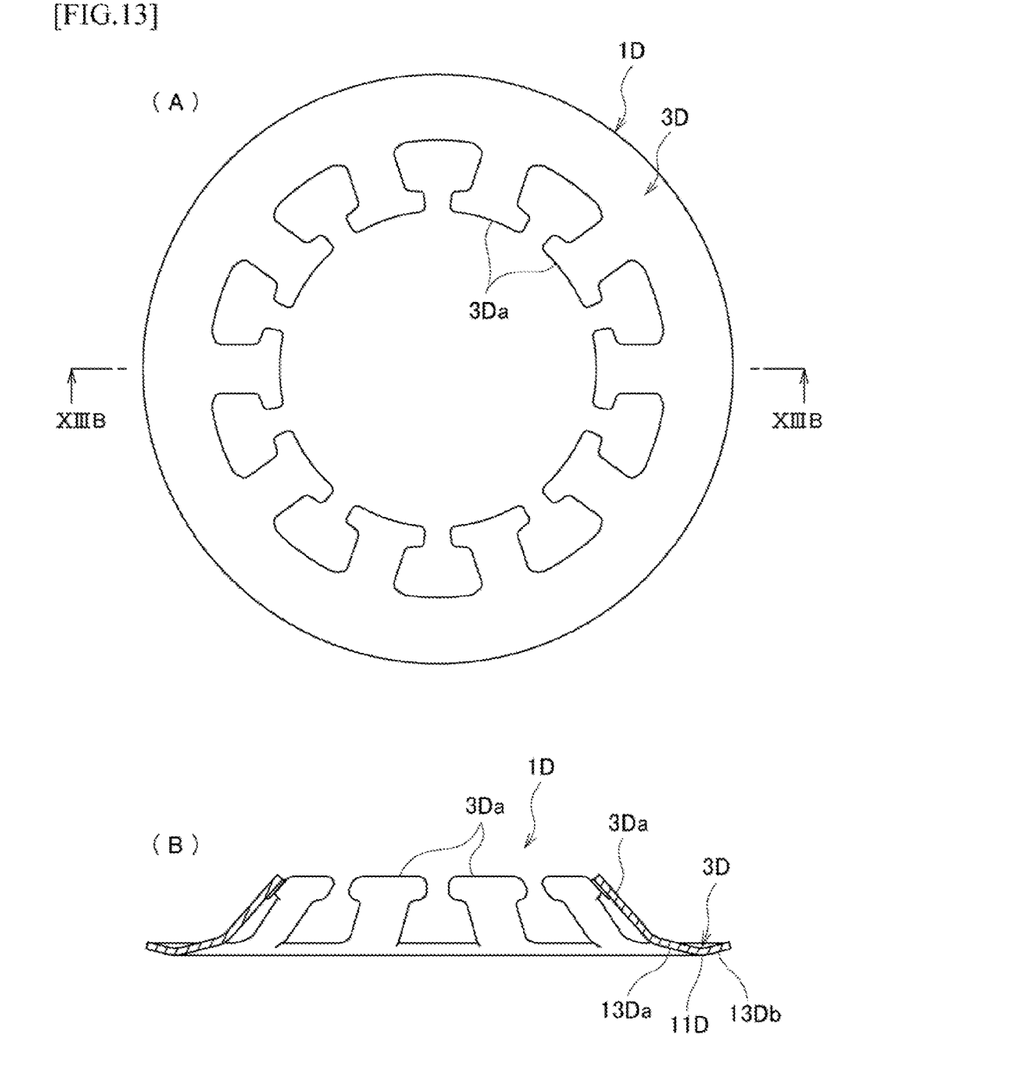
FIG. 13(A) is a front view of a disk spring that is provided with levers on an inner diameter side and FIG. 13(B) is a sectional view taken along a line XIIIB-XIIIB of FIG. 13(A) according to the embodiment 3.
Figure 14:
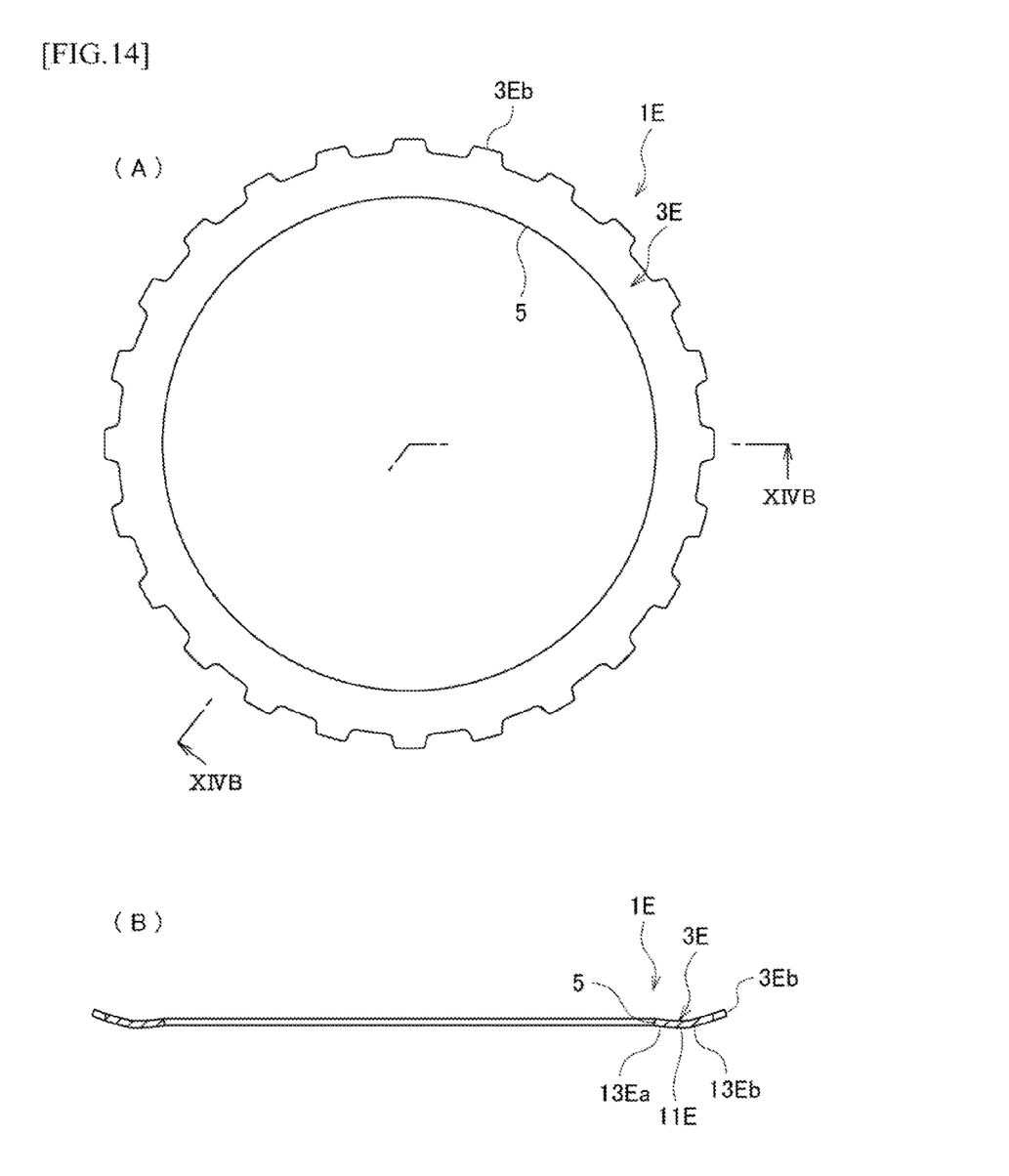
FIG. 14(A) is a front view of a disk spring that is provided with levers on an outer diameter side and FIG. 14(B) is a sectional view taken along a line XIVB-XIVB of FIG. 14(A) according to the embodiment 3.

FIGS. 11 to 14 relate to the embodiment 3 of the present invention in which FIGS. 11 and 12 are sectional views of spring portions having nails on inner and outer diameter sides, FIG. 13(A) is a front view of a disk spring having levers on an inner diameter side and (B) is a sectional view taken along a line XIIIB-XIIIB of (A), and FIG. 14(A) is a front view of a disk spring having levers on an outer diameter side and (B) is a sectional view taken along a line XIVB-XIVB of (A).

The embodiment 3 provides nails or levers as protrusions for engagement on at least one of the inner diameter side and the outer diameter side of the spring portion.

A spring portion 3B of a disk spring 1B of FIG. 11 is provided with inner diameter nails 3Ba and outer diameter nails 3Bb as nails. A rounded cross-section portion 11B, an inner diameter side straight cross-section portion 13Ba, and an outer diameter side straight cross-section portion 13Bb are provided like the embodiment 1.

A spring portion 3C of a disk spring 1C of FIG. 12 is provided with inner diameter nails 3Ca and outer diameter nails 3Cb as nails. The inner diameter nails 3Ca and the outer diameter nails 3Cb are bent relative to the spring portion 3C in mutually opposite directions. A rounded cross-section portion 11C, an inner diameter side straight cross-section portion 13Ca, and an outer diameter side straight cross-section portion 13Cb are provided like the embodiment 1.

A spring portion 3D of a disk spring 1D of FIG. 13 is provided with inner diameter levers 3Ca as levers. A rounded cross-section portion 11D, an inner diameter side straight cross-section portion 13Da, and an outer diameter side straight cross-section portion 13Db are provided like the embodiment 1.

A spring portion 3E of a disk spring 1E of FIG. 14 is provided with outer diameter levers 3Eb as levers. A rounded cross-section portion 11E, an inner diameter side straight cross-section portion 13Ea, and an outer diameter side straight cross-section portion 13Eb are provided like the embodiment 1.

Figure 15:
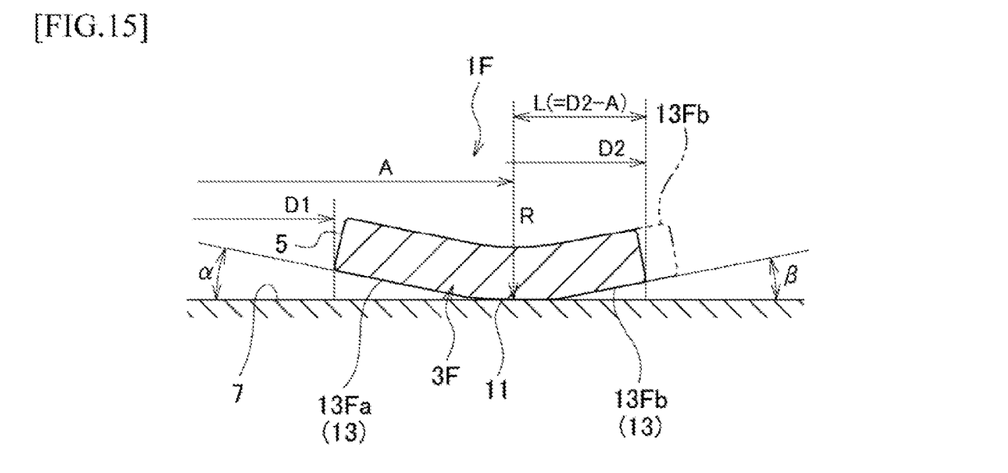
FIG. 15 is a sectional view of a spring portion according to an embodiment 4
Figure 16:
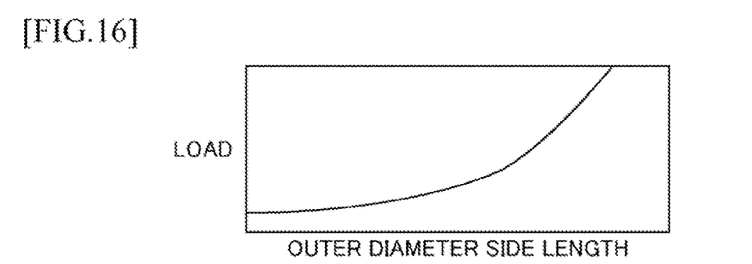
FIG. 16 is a graph illustrating change in load according a radial length on an outer diameter side of the spring portion of FIG. 15 according to the embodiment 4.
Figure 17:
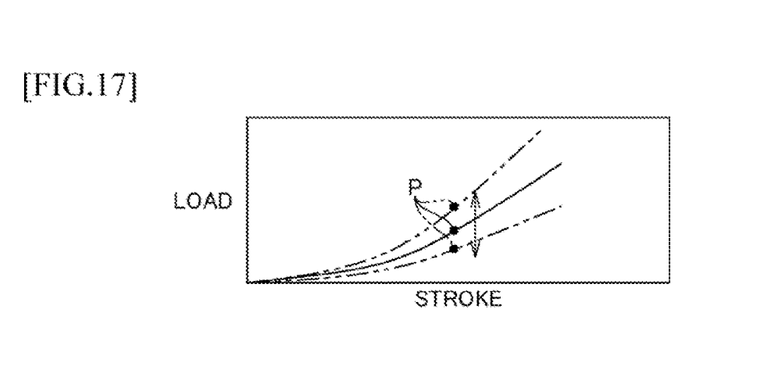
FIG. 17 is a graph illustrating change in a loading characteristic due to a relation between a stroke and load according to change in the radial length on the outer diameter side of the spring portion of FIG. 15 according to the embodiment 4.

FIGS. 15 to 17 relate to the embodiment 4 of the present invention in which FIG. 15 is a sectional view of a spring portion, FIG. 16 is a graph illustrating change in load according a radial length on an outer diameter side of the spring portion of FIG. 15, FIG. 17 is a graph illustrating change in a loading characteristic due to a relation between a stroke and load according to change in a radial length on an outer diameter side of the spring portion of FIG. 15.

A disk spring 1F of the embodiment 4 based on the structure of the embodiment 1 has a radial length L(=D2−A) of an outer diameter side straight cross-section portion 13Fb as a portion on an outer diameter side of a spring portion 3F, the radial length being set on the basis of a load variability characteristic according to the radial length L.

The load variability characteristic gradually non-linearly increases load (in a curved line) as the radial length L of the outer diameter side straight cross-section portion 13Fb increases as illustrated in FIG. 16. In addition, FIG. 16 is a comparison of loads in a state of bending disk springs 1F having different radial lengths L by a particular stroke.

Increment in load of this load variability characteristic is based on increase in rigidity of the spring portion 3F as the radial length L of the outer diameter side straight cross-section portion 13Fb increases. Further, since the increase in load is dependent on increase in volume of the outer diameter side straight cross-section portion 13Fb, it is non-linear with respect to the increase in the radial length L of the outer diameter side straight cross-section portion 13Fb.

Setting the radial length L of the outer diameter side straight cross-section portion 13Fb based on the load variability characteristic of FIG. 16, a loading characteristic due to the relation between the load and the stroke vary according to the length setting as illustrated with two-dot chain lines in FIG. 17.

Namely, as variability in the loading characteristic, the load reduces at the particular stroke as illustrated in FIG. 16 and, in response to this, load (point P, for example) increases or decreases at the corresponding stroke in the loading characteristic of FIG. 17.

According to this variability of the load (point P, for example), the loading characteristic entirely varies rise in the load relative to the stroke. In particular, the rise in the load relative to the stroke increases as the radial length L of the outer diameter side straight cross-section portion 13Fb increases, so that it is possible to further enlarge the increase of the spring constant relative to the stroke (deflection amount). Conversely, the rise in load relative to the stroke reduces as the radial length L reduces.

The disk spring 1F of this embodiment, therefore, allows the loading characteristic to be controlled according to the setting of the radial length L of the outer diameter side straight cross-section portion 13Fb. Further, since the disk spring 1F of this embodiment causes the load to non-linearly increases or decreases as the radial length L increases or decreases, it is possible to suppress the radial length L from carelessly increasing even if the spring constant increases by enlarging the radial length L, thereby to smoothly assemble the disk spring into a limited space.

In addition, the present embodiment is the same as the embodiment 1 in the change in the structure, the operation and the effect.

The invention claimed is:
1. A disk spring comprising:
a spring portion having a circular disk shape, the spring portion configured to be interposed between a pair of rotary members being relatively movable in an axial direction to come close to and separate away from each other, wherein
the spring portion has a width spanning from an inner periphery to an outer periphery in a radial direction of the spring portion and has a rounded cross-section portion and a straight cross-section portion within said width in a cross section extending orthogonal to a circumferential direction of the spring portion and along the radial direction,
the rounded cross-section portion is a curved portion having a concave surface and a convex surface that define a thickness of the rounded cross-section portion, the convex surface including a first contact point con- figured to be brought into contact with a first rotary member of the pair of the rotary members, and the straight cross-section portion is continuous to the rounded cross-section portion and formed on at least one of an inner diameter side and an outer diameter side of the spring portion, the straight cross-section portion has a first end being continuous to the rounded cross-section portion and a second end distal to the rounded cross-section portion so as to extend straightly from the first end to the second end, and has outer surfaces that define a thickness of the straight cross-section portion and are continuous to the respective concave and convex surfaces of the rounded cross-section portion, the second end of the straight cross-section portion includes a second contact point configured to be brought into contact with a second rotary member of the pair of the rotary members and be compressed between both the rotary members in a close contact state.

2. The disk spring according to claim 1, wherein the rounded cross-section portion of the spring portion is formed with a plurality of curvature radiuses.

3. The disk spring according to claim 1, wherein the straight cross-section portion is formed on the inner diameter side of the spring portion, under an allocation of a curvature radius of the rounded cross-section portion: R, an inner diameter side central angle of the rounded cross-section portion: $\theta 1$, a radial position of a center of curvature of the rounded cross-section portion: $\phi A$, an inner diameter of the spring portion: $\phi D1$, and a camber angle of the straight cross-section portion on the inner diameter side relative to the first rotary member of the pair of the rotary members: $\alpha$, and the spring portion satisfies $$R \times \tan \theta 1 < (A - D1)/\cos \alpha.$$

4. The disk spring according to claim 1, wherein the straight cross-section portion is formed on the outer diameter side of the spring portion, under an allocation of a curvature radius of the rounded cross-section portion: R, an outer diameter side central angle of the rounded cross-section portion: $\theta 2$, a radial position of a center of curvature of the rounded cross-section portion: $\phi A$, an outer diameter of the spring portion: $\phi D2$, and a camber angle of the straight cross-section portion on the outer diameter side relative to the first rotary member of the pair said one of the rotary members: $\beta$, and the spring portion satisfies $$R \times \tan \theta 2 < (D2 - A)/\cos \beta.$$

5. The disk spring according to claim 1, wherein protrusions configured for engagement are provided on said at least one of the inner diameter side and the outer diameter side of the spring portion.

6. The disk spring according to claim 1, wherein the spring portion is configured such that a radial length of a portion on the outer diameter side of the spring portion is set based on a load variability characteristic of the spring portion according to said radial length in which the load characteristic gradually non-linearly increases as the radial length of said portion increases.

* * * * *